United States Patent
Branscome

(10) Patent No.: US 10,379,858 B2
(45) Date of Patent: Aug. 13, 2019

(54) METHOD AND APPARATUS FOR EXECUTING CONDITIONAL INSTRUCTION PREDICATED ON EXECUTION RESULT OF PREDICATE INSTRUCTION

(71) Applicant: Spreadtrum Hong Kong Limited, Shanghai (CN)

(72) Inventor: Jeremy Branscome, San Jose, CA (US)

(73) Assignee: Spreadtrum Hong Kong Limited, Shanghai (CN)

( * ) Notice: Subject to any disclaimer, the term of this patent is extended or adjusted under 35 U.S.C. 154(b) by 439 days.

(21) Appl. No.: 14/852,898

(22) Filed: Sep. 14, 2015

(65) Prior Publication Data

US 2017/0075689 A1 Mar. 16, 2017

(51) Int. Cl.
*G06F 9/30* (2018.01)
*G06F 9/38* (2018.01)

(52) U.S. Cl.
CPC ........ *G06F 9/30072* (2013.01); *G06F 9/3832* (2013.01); *G06F 9/3844* (2013.01); *G06F 9/3861* (2013.01)

(58) Field of Classification Search
None
See application file for complete search history.

(56) References Cited

U.S. PATENT DOCUMENTS

| | | | |
|---|---|---|---|
| 5,471,593 A * | 11/1995 | Branigin | G06F 9/30018 712/219 |
| 9,626,185 B2 * | 4/2017 | Sundar | G06F 9/30054 |
| 9,703,565 B2 * | 7/2017 | Burger | G06F 9/3806 |
| 2013/0086370 A1 * | 4/2013 | Burger | G06F 9/45516 712/239 |
| 2013/0283020 A1 * | 10/2013 | Ehrlich | G06F 9/3853 712/226 |
| 2014/0195781 A1 * | 7/2014 | Mudawar | G06F 9/30 712/205 |
| 2016/0179700 A1 * | 6/2016 | Venkatasubramanian | G06F 12/1045 711/205 |
| 2016/0196140 A1 * | 7/2016 | Dayan | G06F 9/30072 712/234 |

* cited by examiner

*Primary Examiner* — William B Partridge
(74) *Attorney, Agent, or Firm* — Finnegan, Henderson, Farabow, Garrett & Dunner, LLP

(57) ABSTRACT

A device for executing conditional instructions is provided. The device includes one or more processors and a memory unit including a plurality of registers storing at least a predicate instruction and a conditional instruction, executable by the one or more processors. Execution of the conditional instructions is predicated on execution results of the predicate instruction. The one or more processors are configured to extract predicate-determining information of the predicate instruction and conditional instruction information of the conditional instruction; predict execution results for the predicate instruction and the conditional instruction based on the predicate-determining information and the conditional instruction information; and execute the predicate instruction and the conditional instruction in parallel, based on the predicted execution results for the predicate instruction and the conditional instruction.

21 Claims, 10 Drawing Sheets

METHOD AND APPARATUS FOR EXECUTING CONDITIONAL INSTRUCTION PREDICATED ON EXECUTION RESULT OF PREDICATE INSTRUCTION

TECHNICAL FIELD

Exemplary embodiments relate to methods and apparatus for executing computer instructions and, more particularly, to methods and apparatus for executing conditional instructions in a computer program.

BACKGROUND

A microprocessor architecture may define conditional instructions affecting data flow. The execution semantics of the conditional instructions are determined dynamically by machine state at the time of execution, which may exhibit little or no effect on control flow. An example of a conditional instruction can be: conditionally select one source register from a set of two or more source registers, whose value will be transferred into a destination register, where the selection is based on a function, f, of some number of predicates. This exemplary conditional instruction can be expressed as follows: CONDSELECT RD←{RS0, RS1, RS2, ... , RSN} (according to f (p0, p1, ... , pM)).

The state of the input predicates may be determined by any number of preceding instructions in a program of instructions, which creates a data dependency between the predicate-determining instruction(s) and the conditional instruction itself. Similarly, instructions subsequent to the conditional instruction may consume output(s) of the conditional instruction, creating data dependencies between the conditional instruction and its consumers.

Generally, implementations of such an architecture may provide parallel execution resources to optimize execution throughput and latency. Due to the aforementioned dependencies, however, conditional instructions may require serialization to ensure that the values of the predicates have been produced before the conditional instruction executes, which may significantly reduce parallelism. The results of the conditional instructions must be made visible before any dependent instructions may be executed after the conditional instruction (i.e., serial, not parallel, execution). This reduces the speed of execution and may lead to a waste of pipeline resources. Therefore, there is a need to provide a new architecture for executing conditional instructions.

SUMMARY OF EMBODIMENTS

Consistent with embodiments of this disclosure, there is provided a device for executing conditional instructions. The device includes one or more processors and a memory unit including a plurality of registers storing at least a predicate instruction and a conditional instruction, executable by the one or more processors. Execution of the conditional instructions is predicated on execution results of the predicate instruction. The one or more processors are configured to extract predicate-determining information of the predicate instruction and conditional instruction information of the conditional instruction; predict execution results for the predicate instruction and the conditional instruction based on the predicate-determining information and the conditional instruction information; and execute the predicate instruction and the conditional instruction in parallel, based on the predicted execution results for the predicate instruction and the conditional instruction.

Consistent with embodiments of this disclosure, there is provided a method of executing at least a predicate instruction and a conditional instruction stored in a plurality of registers by one or more processors. The execution of the conditional instructions is predicated on execution results of the predicate instruction. The method includes extracting predicate-determining information of the predicate instruction and conditional instruction information of the conditional instruction; predicting execution results for the predicate instruction and the conditional instruction based on the predicate-determining information and the conditional instruction information; and executing the predicate instruction and the conditional instruction in parallel, based on the predicted execution results for the predicate instruction and the conditional instruction.

Consistent with embodiments of this disclosure, there is provided a non-transitory computer-readable medium storing instructions which, when executed by one or more processors, cause the one or more processors to execute at least a predicate instruction and a conditional instruction. The one or more processors are configured to: extract predicate-determining information of the predicate instruction and conditional instruction information of the conditional instruction; predict execution results for the predicate instruction and the conditional instruction based on the predicate-determining information and the conditional instruction information; and execute the predicate instruction and the conditional instruction, based on the predicted execution results for the predicate instruction and the conditional instruction.

BRIEF DESCRIPTION OF THE DRAWINGS

Reference will now be made, by way of example, to the accompanying drawings which show exemplary embodiments of the present application, and in which.

DESCRIPTION OF EXAMPLE EMBODIMENTS

Reference will now be made in detail to exemplary embodiments, examples of which are illustrated in the accompanying drawings. The following description refers to the accompanying drawings in which the same numbers in different drawings represent the same or similar elements, unless otherwise noted. The implementations set forth in the following description of exemplary embodiments do not represent all implementations consistent with the invention. Instead, they are merely examples of apparatus and methods consistent with aspects of the invention as recited in the appended claims.

Figure 1:
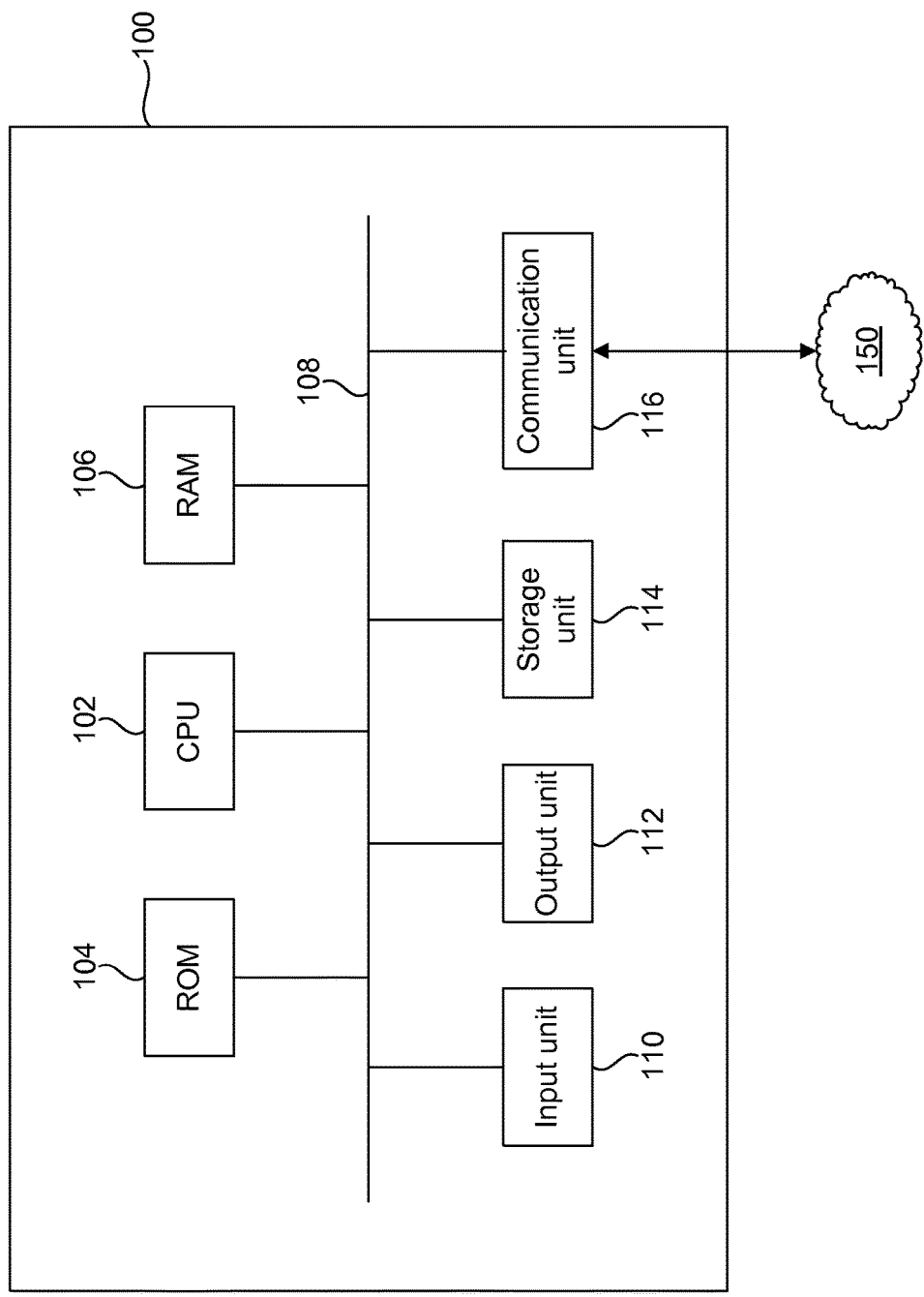
FIG. 1 shows a schematic diagram of an apparatus consistent with this disclosure.

FIG. 1 depicts an exemplary apparatus 100 for executing conditional instructions in a program. Apparatus 100 may be an electronic device such as a smart phone, a tablet, a laptop computer, a desktop computer, etc. Apparatus 100 may include one or more central processing units (CPU) 102, read-only memory (ROM) 104, random access memory (RAM) 106, input units 110, output units 112, storage units 114, and communication units 116, which can be coupled to each other through one or more buses 108 (one shown).

CPU 102, which functions as an arithmetic processing device and a control device, controls or partially controls the operations of apparatus 100 to execute various programs recorded in ROM 104, RAM 106, storage unit 114 or a removable recording medium (not shown). ROM 104 stores the programs, arithmetic operation parameters and the like used by the CPU 102. RAM 106 temporarily stores one or more programs used by CPU 102 as it performs specific processing, and parameters when executing the one or more programs.

Input unit 110 may be a user input device, such as a mouse, a keyboard, a touch panel, a button, a switch, or a joystick. Further, input unit 110 may be a remote-control device which transmits signals via infrared or another type of electromagnetic wave to a server device. Input unit 110 further includes an input control circuit which generates input signals based upon information entered by the user.

Output unit 112 can be a display device such as a CRT (cathode ray tube) display device, a liquid crystal display (LCD) device, a plasma display panel (PDP) device, an EL (electro-luminescence) display device or a lamp, an audio output device such as a speaker or a headphone, or a printer, a portable telephone or a facsimile machine, capable of providing the user with information in a visual or audio format.

Storage unit 114 may be a magnetic storage device such as an HDD (hard disk drive), a semiconductor storage device, an optical storage device or a magneto-optical storage device. Storage unit 114 stores programs to be executed by CPU 102, various types of data, content, content metadata, lookup tables, and various instructions.

Communication unit 116 connects with network 150. Communication unit 116 may be a communication card for wired or wireless LAN (local area network) communication; Bluetooth communication or WUSB (wireless USB) communication; a router for optical communication; a router for an ADSL (asymmetric digital subscriber line); or a modem used for various types of communication.

Figure 2:
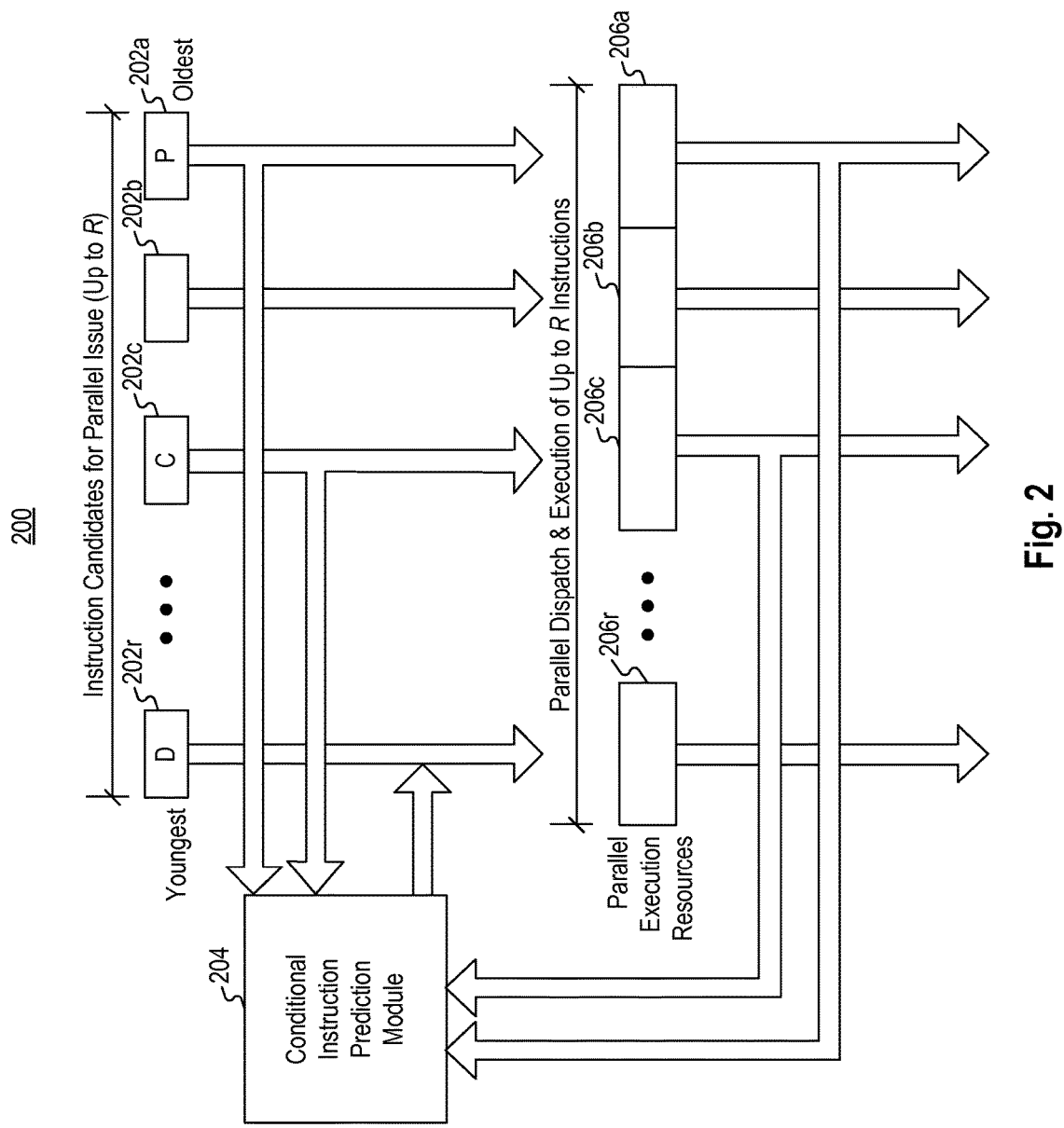
FIG. 2 shows a schematic block diagram of an apparatus consistent with this disclosure.

FIG. 2 depicts a block diagram of an exemplary apparatus 200 for executing conditional instructions, consistent with embodiments of this disclosure. Apparatus 200 may include registers 202a, 202b, 202c, . . . , and 202r (r being an integer a 1); a conditional instruction prediction module 204; and parallel execution resources 206a, 206b, 206c, . . . and 206r. Registers 202a, 202b, 202c, . . . , and 202r are configured to store instructions to be executed. As shown in the embodiment of FIG. 2, register 202a stores predicate instruction P, which is the oldest instruction in the pipeline; register 202c stores conditional instruction C; register 202b stores an instruction unrelated to conditional instruction C; and register 202r stores an instruction D that will be affected by the execution results of the conditional instruction C. In this example, instruction D is also the youngest instruction in the pipeline.

Before executing the instructions stored in registers 202a, 202b, 202c, . . . , and 202r, conditional instruction prediction module 204 may extract the predicate-determining instruction information related to predicate instruction P from register 202a and the conditional instruction information related to condition instruction C from register 202c. The predicate-determining instruction information can include the address and history of the predicate instruction P. The conditional instructions information may include one or more of: the location of the conditional instruction C in a program, the type of the conditional instruction, and the history of the conditional instruction. Based on the predicate-determining instruction information and the conditional instruction information, conditional instruction prediction module 204 may be further configured to provide predicate prediction to register 202c (or another register) so that conditional instruction C may be executed with the predicate prediction, and provide the results of the prediction to register 202r (or another register) so that instruction D can be executed with the results prediction. The prediction may be made via a machine learning process, details of which will be described below. In some embodiments, the results prediction may include at least an indication of whether the conditional instruction C will be executed and the expected execution results of the conditional instruction C. In some embodiments, the predicted execution result of the conditional instruction C is predicted by assuming that the conditional instruction C is executed based on the predicted execution results of the predicate instruction P.

Conditional instruction prediction module 204 may also be configured to control parallel execution resources 206a, 206b, 206c, . . . , and 206r to execute R number of instructions including instructions P, C, and D in parallel. In some embodiments, the instructions may be executed concurrently. In some embodiments, conditional instruction C is executed using the predicted execution results of predicate instruction P, and instruction D is executed using the predicted execution results of conditional instruction C.

Following the parallel execution, conditional instruction prediction module 204 may retire predicate instruction P and other instructions that precede conditional instruction C, but are not predicates to condition instruction C. Although the conditional instruction C is illustrated to have one predicate instruction in FIG. 2, the present disclosure is not so limited. In some embodiments, the conditional instruction may include more than one predicate instruction. Conditional instruction prediction module 204 may be further configured to extract the actual execution results of predicate instruction P and conditional instruction C. Conditional instruction prediction module 204 may be further configured to compare the actual execution results with the predicted results of predicate instruction P. When the prediction for predicate-determining instructions is correct, all of the execution results of parallel execution of instructions P through D are also correct and all of the instructions P through D can be retired. Thus, if it is determined that the prediction is correct, conditional instruction prediction module 204 may retire the conditional instruction C and other instructions through instruction D as well.

If the prediction is incorrect, conditional instruction prediction module 204 may provide a remedy. For example, prediction module 204 may flush and re-execute conditional instruction C and those instructions younger than the conditional instruction C. In the next round of execution, the prediction function may be disabled and the actual execution results of predicate instruction P may be provided when the conditional instruction C is executed. In some embodiments, one or more instructions between conditional instruction C and instruction D may be retired if they are unrelated to conditional instruction C and the execution is an out-of-order implementation.

In some embodiments, instruction D and all operations related to instruction D may be omitted from the parallel execution. That is, one parallel execution may include at least one conditional instruction and one or more of its predicate instructions, but no instruction that will depend on the execution results of the conditional instruction.

In some embodiments, conditional instruction prediction module 204 may store the actual execution results of predicate instruction P and the execution results of conditional instruction C. The stored execution results may be applied to build a state machine for predicting results. For example, results prediction for a given conditional instruction may utilize and correlate global or local histories of past behaviors of one or more conditional instruction execution results. Results of other unrelated conditional instructions may also be referenced, such as results of instructions affecting control flow (e.g., branches). In some embodiments, results prediction may involve indirect references to register or memory locations, or exact values expected to be produced by the conditional instructions.

The predictions may be based on a variety of data. For example, a prediction may be based on properties of the conditional instructions themselves and predicate-determining instructions, such as their location in the program, history of past execution, etc. In one example, the accuracy of a prediction involving a conditional instruction and a predicate instruction (Ci, Pi) can be improved if Pi was executed in the past and its execution results can be referenced to make the prediction. In another example, the accuracy of prediction involving a conditional instruction and three predicate instructions (Ci, P1, P2, Pi) can be improved if Pi has been executed in the past and its execution results can be referenced to make the prediction when P1 and P2 are acted on by the state machine.

In some embodiments, prediction information may be stored and referenced in a plurality of ways. For example, the history and location of a conditional instruction within a program may be hashed to provide references to the stored prediction information. In one embodiment, the address of the conditional instruction can be hashed to form a hash table storing prediction information. The hash table may be accessed in making predictions for subsequent conditional instructions. In some embodiments, the hash table may contain the latest execution results, such as the latest 10 or 20 results, where the newest results may overwrite the oldest results on the table. In some embodiments, the hash table may contain all past execution results.

In some embodiments, prediction module 204 may utilize multiple techniques to optimize precision and accuracy, including multi-modal state, neural networks, and machine learning, etc. Prediction techniques may be selected based on the type of conditional instruction (e.g., conditional select, conditional compare, etc.), in the case where knowledge of instruction type may influence the prediction that is made.

In some embodiments, conditional instruction prediction module 204 may dynamically enable or disable prediction, or to relearn an instruction's behaviors. For example, conditional instruction prediction module 204 may detect whether there is a conditional instruction in a set of instructions that will be executed in the pipeline in parallel, and enable prediction if there is at least one conditional instruction. After acquiring execution results indicating that a prediction is incorrect, conditional instruction prediction module 204 may disable the prediction and provide a remedy for the conditional instruction.

The functions of conditional instruction prediction module 204 can be performed by CPU 102 and one or more of ROM 104, RAM 106, and storage unit 114; the functions of parallel execution resources 206a, 206b, 206c, . . . , and 206r can be performed by CPU 102. Registers 202a, 202b, 202c, . . . , and 202r can be part of ROM 104, RAM 106, and storage unit 114.

Figure 3:
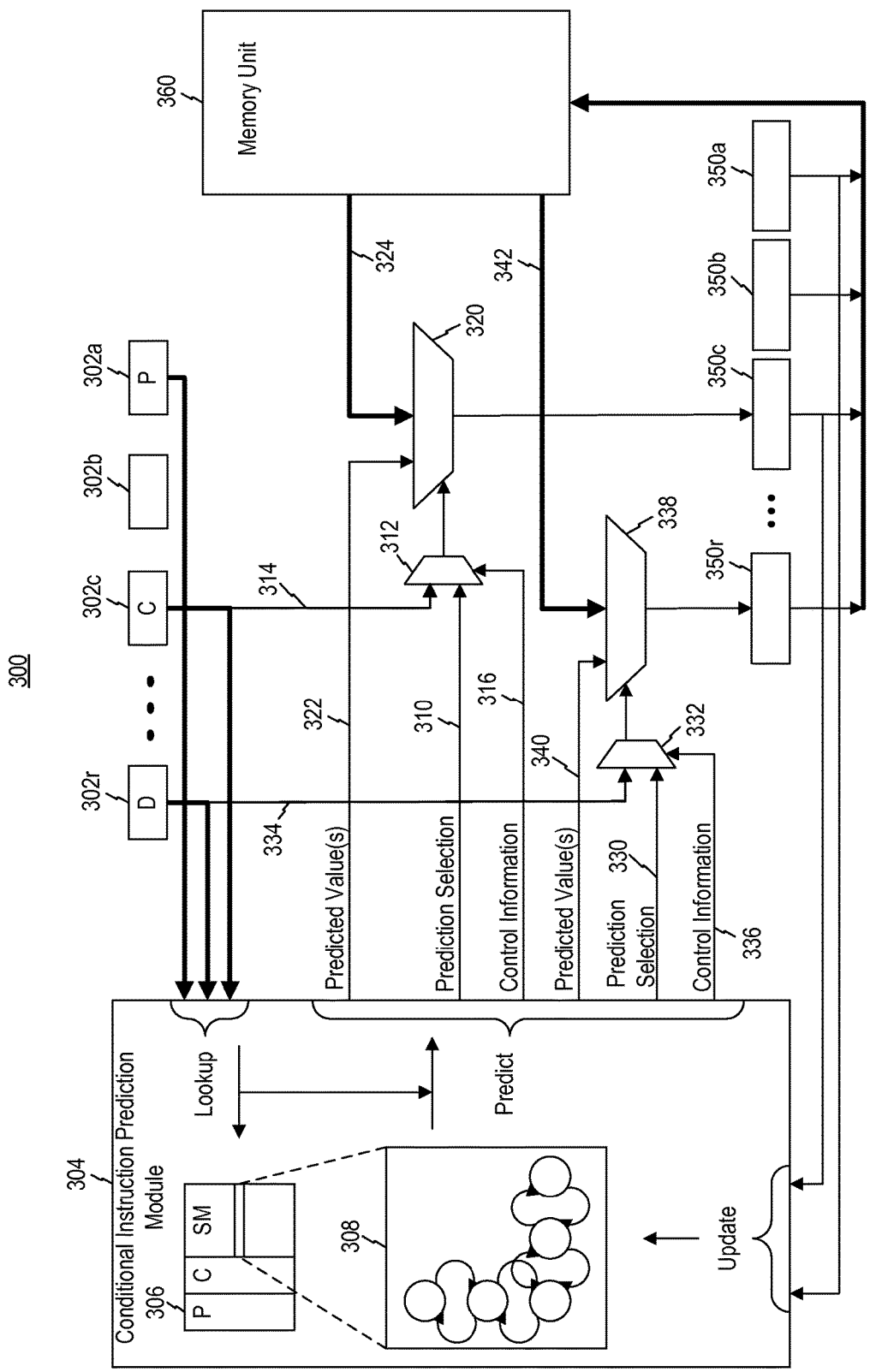
FIG. 3 shows a schematic block diagram of an apparatus consistent with this disclosure.

FIG. 3 depicts a block diagram of an exemplary apparatus 300 for executing conditional instructions, consistent with embodiments of this disclosure. Apparatus 300 may include registers 302a, 302b, 302c, . . . , and 302r (r being an integer a 1); a conditional instruction prediction module 304; parallel execution resources 350a, 350b, 350c, . . . and 350r; and a memory unit 360. The structures and functions of registers 302a, 302b, 302c, . . . , and 302r, and parallel execution resources 350a, 350b, 350c, . . . and 350r may be similar to those described with apparatus 200 in FIG. 2 above.

Conditional instruction prediction module 304 may generate and store one or more lookup tables 306. A lookup table 306 may include information related to predicate instruction (P), conditional instruction (C), and corresponding prediction information, such as a state machine (SM).

Conditional instruction prediction module 304 may extract the predicate-determining instruction information related to predicate instruction P from register 302a and the conditional instruction information related to condition instruction C from register 302c. The predicate-determining instruction information may include the address and history of the predicate instruction P. The conditional instructions information may include one or more of: the location of the conditional instruction C in a program, the type of the conditional instruction, and the history of the conditional instruction. Based on the predicate-determining instruction information and the conditional instruction information, conditional instruction prediction module 304 may be further configured to look up information in one or more lookup tables 306 to generate a prediction.

In some embodiments, prediction module 304 may find an entry that is the same as or similar to the predicate-determining instruction information and the conditional instruction information and use a state machine to provide prediction information. For example, referring to FIG. 3, prediction module 304 may provide an instruction 310 to select prediction results as an input to a first determination unit 312. First determination unit 312 may also receive an input instruction 314 related to conditional instruction C input instruction 314 is to select a resource from a non-predictive value, such as those supplied from memory unit 360. Based on the lookup results, prediction module 304 may further provide control information 316 to first determination unit 312 so that first determination unit 312 may select and provide instruction 310 as control information to a second determination unit 320. Prediction module 304 may also provide one or more predictive value(s) 322, based on the lookup results, as an input to second determination unit 320, which may further receive one or more non-predictive values 324 from a storage device, such as memory unit 360, that may store a plurality of past execution results.

In some embodiments, non-predictive values 324 may be supplied to second determination unit 320 based on information encoded in conditional instruction C itself upon presentation of conditional instruction C for execution. Second determination unit 320 may select predictive value(s) 322 based on the content of instruction 310 provided by first determination unit 312. Parallel execution resource 350c may then execute conditional instruction C based on the assumption that the predictive value(s) are true. That is, the conditional instructions may be executed using the predictive value(s) as input.

In some embodiments, prediction module 304 may find that no entry in the stored lookup tables 306 is similar to the extracted predicate-determining instruction information or to the conditional instruction information. In that case, prediction module 304 may create a new entry in one of the lookup tables or to create a new lookup table. Prediction module 304 may provide control information 316 that enables first determination unit 312 to select instruction 314 related to conditional instruction C. Instruction 314 in turn may enable second determination unit 320 to select a resource from a non-predictive value 324 and provide non-predictive value 324 to parallel execution resource 350c to execute conditional instruction C.

In a similar manner, when a parallel execution involves an instruction D that is dependent on the execution results of conditional instruction C, prediction module 304 may extract information related to instruction D stored in register 302r. The extracted information may be used to search lookup tables 306 or generate an entry in lookup tables 306 or in a new lookup table created to hold the extracted information.

If prediction module 304 is able to make prediction based on the extracted information of instructions C and D, prediction module 304 may provide an instruction 330 forwarding the prediction results to a third determination unit 332, which may also receive an input instruction 334 related to instruction D. Prediction module 304 may also provide control information 336 to third determination unit 332, which may select and provide instruction 330 to fourth determination unit 338. Fourth determination unit 338 may receive predicted value(s) 340 and non-predictive value(s) 342 from memory unit 360. Upon receipt of instruction 330, fourth determination unit 338 may select predicted value(s) 340 as source value(s) for executing instruction D.

In some embodiments, when the extracted information of instruction D does not result in a prediction, prediction module 304 may output control information 336, instructing third determination unit to select instruction 334 as control information for fourth determination unit 338. Upon receipt of instruction 334, fourth determination unit 338 may select and provide non-predictive value(s) 342 from memory unit 360 to execution resource 350r.

In one embodiment, conditional instruction C may be a conditional select instruction (e.g., to select one register from a plurality of source registers, whose value will be transferred into a destination register). In this case, the prediction of the execution results for predicate instruction P may be sent as predicted value(s) for predicate source operands of conditional instruction C. At the same time, control information 316 may indicate that instruction 310 is to be selected by first determination unit 312. Instruction 310 may enable second determination unit 320 to select predicted value(s) provided by prediction module 304. Further, if a dependent instruction D is observed to be dependent on a predictive state, then prediction module 304 may predict the results (predicted value(s) 340) of executing conditional instruction C. In some embodiments, the predicted results may be that a selection will be made instead of an actual value.

In one embodiment, if conditional instruction C is a conditional compare to perform a comparison based on predicates, predicted value 322 may be a value representing "Execution" or "No Execution" as the predicate source operands of conditional instruction C. In this case, the predicted value(s) 340 for dependent instruction D may represent the comparison results (e.g., "True" or "False") of executing instruction C.

Conditional instruction prediction module 304 may also be configured to control parallel execution resources 350a, 350b, 350c, . . . , and 350r to execute R number of instructions including instructions P, C, and D in parallel. In some embodiments, the instructions may be executed concurrently. Although in the illustrated embodiments instruction D is dependent on conditional instruction C, the present disclosure is not so limited. In some embodiments, candidate instructions for parallel execution may include one conditional instruction and one or more of its predicate instructions, and no instruction dependent on the conditional instruction.

Following the parallel execution, conditional instruction prediction module 304 may retire predicate instruction P and other instructions that precede conditional instruction C, but are not predicates to condition instruction C. Conditional instruction prediction module 304 may be further configured to extract the actual execution results of predicate instruction P and conditional instruction C. Prediction module 304 may use the actual execution results to update lookup table(s) 306, including the prediction information stored therein. For example, Prediction module 304 may use the actual execution results to update the state machine that was used to make the prediction for the execution.

Conditional instruction prediction module 304 may be further configured to compare the actual execution results with the predicted results of predicate instruction P. When the prediction for predicate-determining instructions is correct, all of the execution results of parallel execution of instructions P through D are also correct and all of the instructions P through D can be retired. Thus, if it is determined that the prediction is correct, conditional instruction prediction module 304 may retire the conditional instruction C and other instructions through instruction D as well.

If the prediction is incorrect, conditional instruction prediction module 304 may provide a remedy. For example, prediction module 304 may flush and re-execute conditional instruction C and those instructions younger than the conditional instruction C. In the next round of execution, the prediction function may be disabled and the actual execution results of predicate instruction P may be provided when the conditional instruction C is executed. In some embodiments, one or more instructions between conditional instruction C and instruction D may be retired if they are unrelated to conditional instruction C and the execution is an out-of-order implementation.

In some embodiments, all of the execution results from execution resources 350a, 350b, 350c, . . . 350r may be forwarded to memory unit 360 for storage and may be used for execution of the program. In some embodiments, memory unit 360 may be integrated with prediction module 304.

The functions of conditional instruction prediction module 304, determination units 312, 320, 332, and 344 may be performed by CPU 102 and one or more of ROM 104, RAM 106, and storage unit 114; the functions of parallel execution resources 350a, 350b, 350c, . . . , and 350r may be performed by CPU 102. Registers 302a, 302b, 302c, . . . , and 302r, and memory unit 360 may be part of ROM 104, RAM 106, and storage unit 114.

Figure 4:
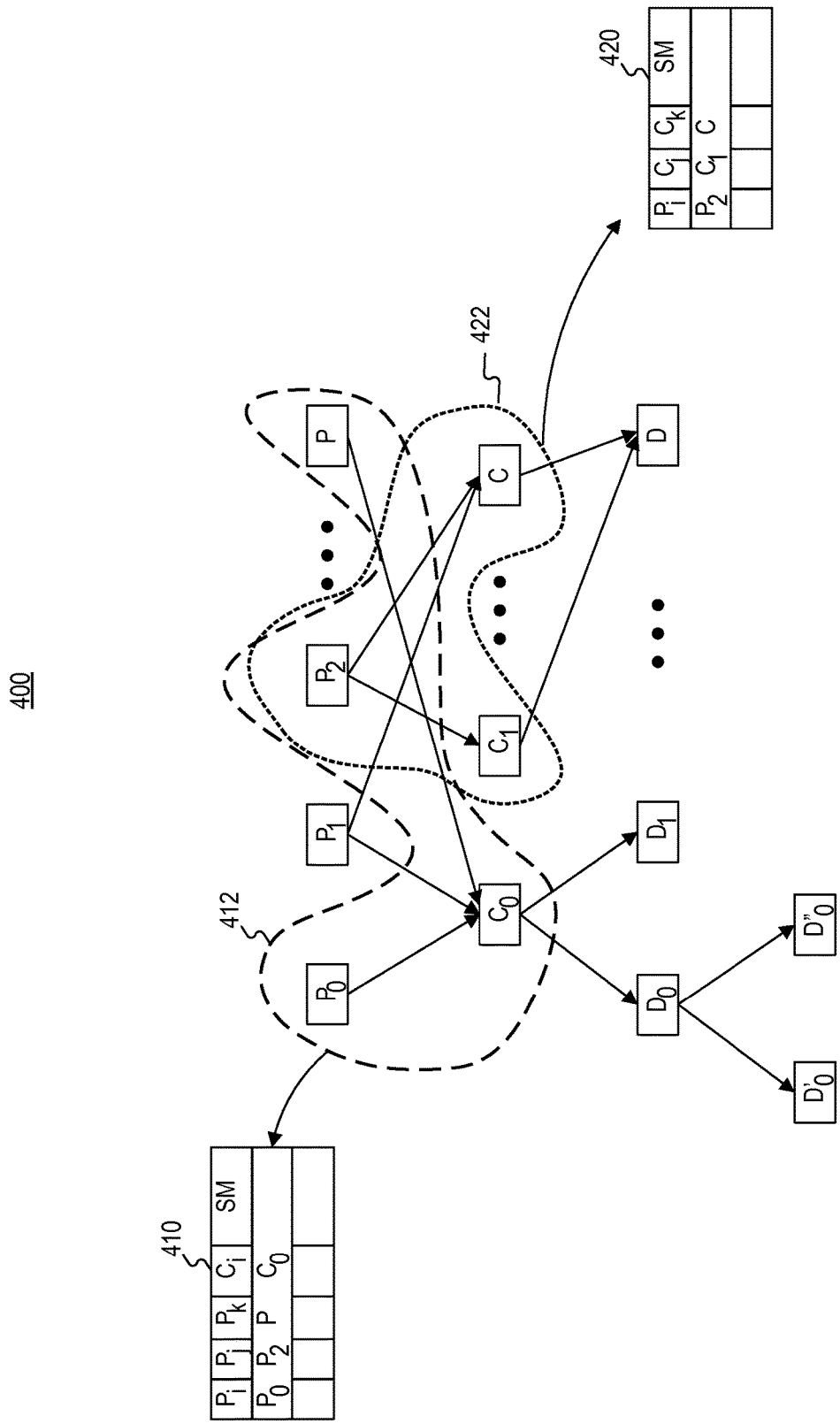
FIG. 4 shows an exemplary formation of lookup tables consistent with this disclosure.

FIG. 4 depicts the formation of exemplary lookup tables 410 and 420. A code space 400 may include any number of instructions. For example, referring to FIG. 4, code space 400 may include predicate instructions $P_0$, $P_1$, $P_2$, . . . P; conditional instructions $C_0$, $C_1$, . . . C; first level dependent instructions $D_0$, $D_1$, . . . D; and second level dependent instructions $D'_0$ and $D''_0$. Here, predicate instructions are defined as that they do not depend on other instruction for execution and have no unexpected input data dependency when they are observed as execution candidates. The instructions in code space 400 may have arbitrary dependencies. In the illustrated embodiment shown in FIG. 4, $C_0$ depends on $P_0$, $P_2$, and P; $C_1$ depends on $P_2$; C depends on $P_1$, and $P_2$; both $D_0$ and $D_1$ depend on $C_0$; D depends on $C_1$, and $C_k$; and both $D'_0$ and $D''_0$ depend on $D_0$. Although a plurality of dependencies is illustrated in FIG. 4, the basic code dependency may involve one or more conditional instructions $C_j$ and one or more of its predicate instructions $P_i$.

In one embodiment, a set of instructions 412 including $P_0$, $P_2$, P and $C_0$, are observed to be the candidates for a parallel execution, where $P_0$, $P_2$, and P are predicates to $C_0$. A prediction module, such as prediction modules 204 (FIG. 2) and 304 (FIG. 3), may detect that conditional instruction $C_0$ depends on predicate instructions $P_0$, $P_2$, and P, extract information related to instructions $P_0$, $P_2$, P and $C_0$, and search lookup tables with the extracted information to establish or track a predictive state by a prediction technique, such as a state machine, a neural network, etc. If instruction set 412 has not been tracked before, table 410 may be created. If instruction set 412 has been tracked before, the predictive state (SM) in table 410 may be updated based on execution results of $P_0$, $P_2$, P and $C_0$. The extracted information of instructions $P_0$, $P_2$, P and $C_0$ may include their location in the code space and the types of instructions $P_i$ and $C_j$.

Referring to FIG. 4 again, similarly, a set of instructions 422 including $P_2$, $C_1$ and C, may be the candidates for a parallel execution, where $P_2$ is a predicate to both $C_1$ and C. A prediction module may detect that the dependency among the instruction set, extract information related to instructions $P_2$, $C_1$ and C, and search lookup tables with the extracted information to establish or track a predictive state by a prediction technique, such as a state machine, a neural network, etc. If instruction set 422 has not been tracked before, table 420 may be created. If instruction set 422 has been tracked before, the predictive state (SM) in table 420 may be updated based on execution results of $P_2$, $C_1$ and C.

Upon initial presentation of instruction information, if an exact match of predictive information does not exist in lookup tables, a decision may be made between using an existing "similar" or "near" entry of a given table and allocating a new entry. For example, when presented with a set of instructions ($P_2$, P, $C_0$), the illustrated entry of table 410 of FIG. 4 may be used, despite the absence of $P_0$, if the existing entries sufficiently match the input characteristics. Examples of nearness or similarity may involve proximity of instruction location, similarity of instruction type, relative distribution of locations, etc. In some embodiments, the "near" entry may be used to generate an immediate prediction, while a new exact entry for further tracking may be simultaneously created. The state of a new instructions set may then be copied and tracked independently.

In some embodiments, as shown in FIG. 4, a conditional instruction C may be a predicate of another instruction, and may be tracked in different state table entries, as instruction execution and candidate alignments may vary even when a re-execution is performed over a given code space. This phenomenon may also influence or invoke a "nearness" match and utilization of an existing state entry. For example, if a presented set of candidate instructions information is simply a column-shifted version of a state table entry, that entry may be deemed near and utilized, at least as an initial prediction for establishing a new state tracking entry. In some embodiments, a presented set of candidate instructions information may be a column-shifted version of a state table entry. In that case, that entry may replace and revoke the existing entry in the lookup table under certain circumstances, for example, if state table storage resources are limited.

When conditional instruction prediction module 204 (FIG. 2) or 304 (FIG. 3) receives conditional instruction information, it may determine the type of the conditional instructions to select a state machine corresponding to the type.

Figure 5A:
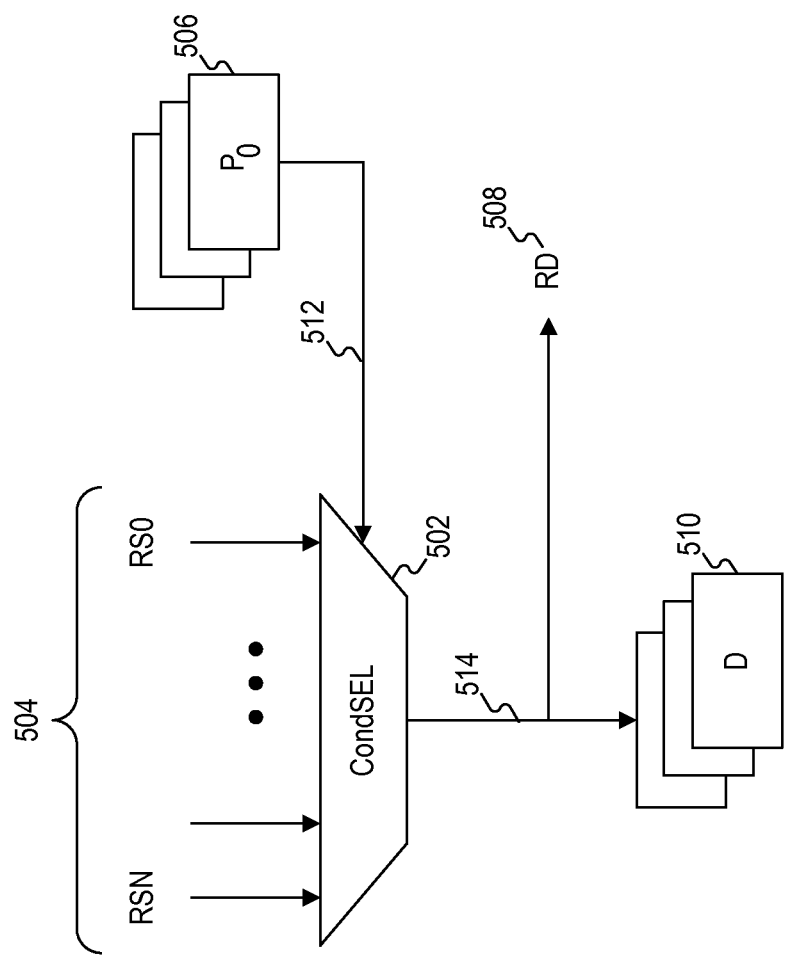
FIG. 5A shows an exemplary execution flow consistent with this disclosure.

An example of a conditional select is illustrated in FIG. 5A. An execution unit CondSEL 502 is configured to select from source registers RS0-RSN 504 based on at least one predicate P0 506. After the execution, the value of the selected register is saved to destination register RD 508. In some embodiments, the execution results may be saved in a memory unit D 510. In this case, at least data flows 512 and 514 may be predicted and tracked, respectively. For example, as discussed above, data flow 512 may include related information of predicate P0 506 that may be extracted by a prediction module, such as prediction module 204 (FIG. 2) or 304 (FIG. 3). Data flow 512 may also include control information provided by the prediction module based on the extracted information, for execution unit CondSEL 502 to select a source register and the value stored therein from source registers RS0-RSN 504. The execution results of execution unit CondSEL 502, represented by dataflow 514 may be saved in a memory unit or as a feedback to the prediction module to track predicate P0 506 and the conditional select.

Figure 5B:
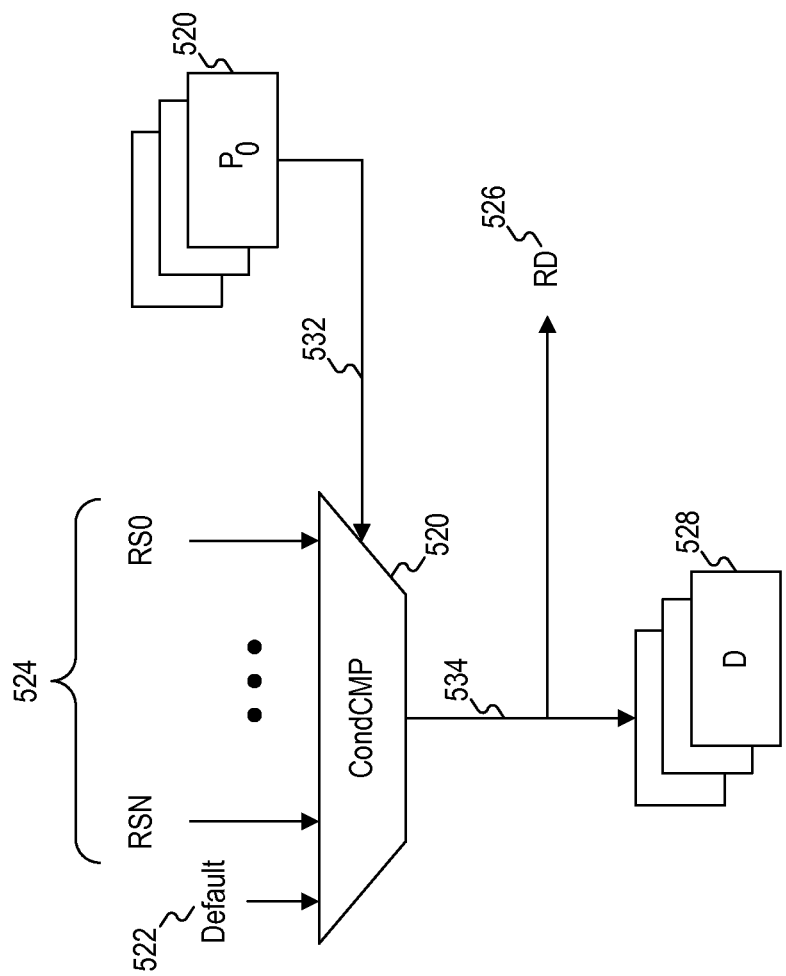
FIG. 5B shows an exemplary execution flow consistent with this disclosure.

FIG. 5B shows an exemplary conditional compare, which is a type of instruction that, based on a function of at least one predicate, compares two operands and writes a predicate result. An execution unit CondCMP 520 is configured to compare a Default value 522 with a value selected from registers RS0-RSN 524. The comparison result is then saved to destination register RD 526. In some embodiments, the execution results may be saved in a memory unit D 528. In this case, at least data flows 532 and 534 may be predicted and tracked, respectively.

Figure 5C:
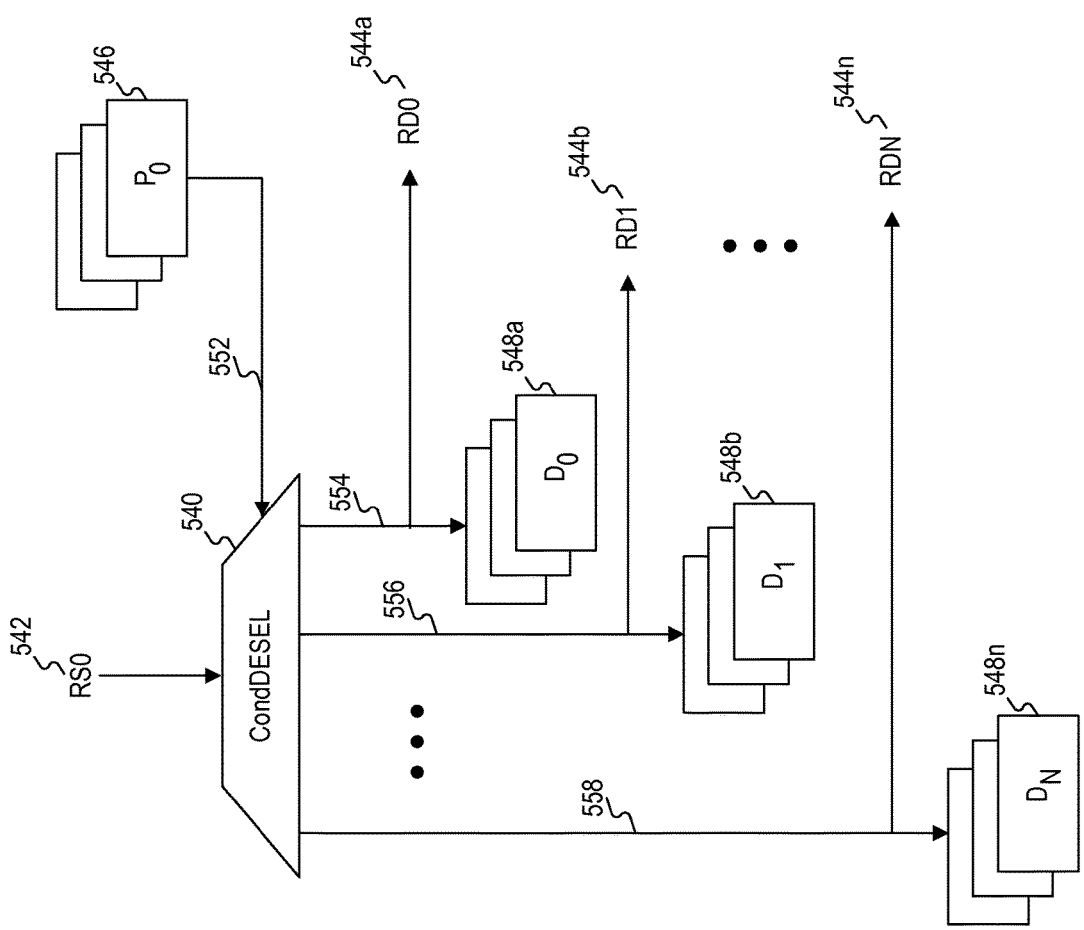
FIG. 5C shows an exemplary execution flow consistent with this disclosure.

FIG. 5C shows an exemplary conditional deselect, which is a type of instruction that, based on a function of at least one predicate, writes the value of a given source register to one of multiple target registers. An execution unit CondDESEL 540 is configured to write a value of register RS0 542 to one of destination registers RD0 544a, RD1 544b, . . . RDN 544n, based on at least one predicate P0 546. In some embodiments, the execution results may be saved in one of memory units D0 548a, D1 548b, . . . DN 548n associating with RD0 544a, RD1 544b, . . . RDN 544n. In this case, at least data flow 552 may be predicted and data flows 554, 556, and 558 may be tracked.

Figure 6:
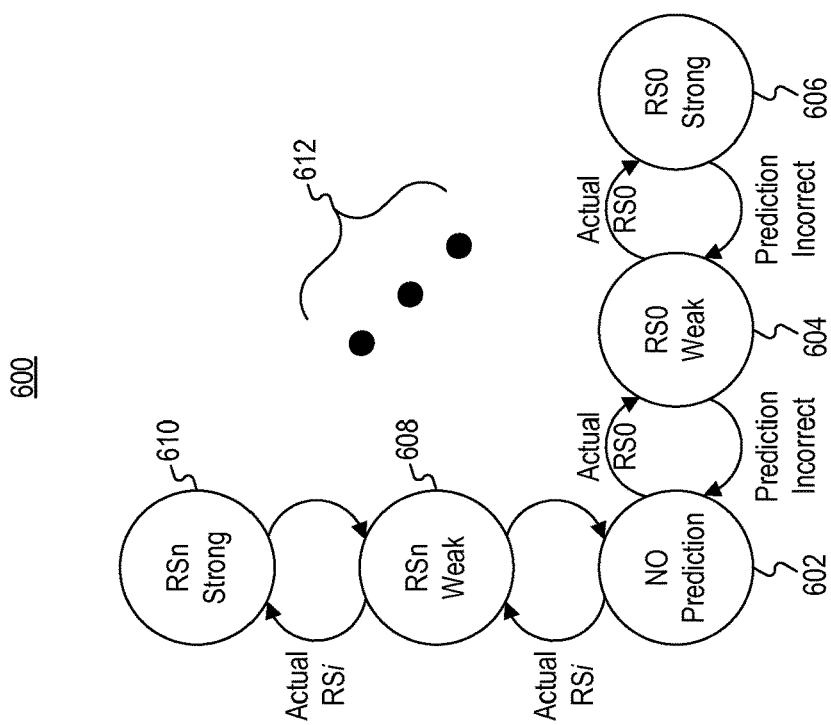
FIG. 6 is an exemplary state machine consistent with this disclosure.

State machine 308 shown in FIG. 3 for making prediction will be further described below. Referring to FIG. 6, a conditional instruction prediction module such as prediction module 304 (FIG. 3) may determine that the conditional instruction is a type of conditional select and use state machine 600 to select a register from a plurality of registers RS0, RS1, . . . , RSn, whose value will be transferred into a destination register.

Initially, when conditional instruction prediction module 304 has yet not stored execution results of any conditional instruction or its predicate, the state machine 600 may be said to be at a ground state 602, where no prediction is provided. Once a prediction is made and the result is correct, the state machine 600 may be said to be at a "Weak" state. And if the result of a further prediction is correct, the state machine 600 may be said to be at a "Strong" state. Prediction based on a "Strong" state would have a higher probability of accuracy than a "Weak" state.

When conditional instruction prediction module 304 receives execution results of a conditional instruction, state machine 600 moves to one of the states adjacent to ground state 602, such as state 604 ("RS0 Weak") or state 608 ("RSn Weak"). For example, assuming that state machine 600 moves to state 604, conditional instruction prediction module 304 may enable the prediction function to predict the results of the conditional instruction. When a similar or the same predicate is provided, conditional instruction prediction module 304 may make a prediction based on the current state (state 604).

In FIG. 6, for example, conditional instruction prediction module 304 has predicted that register RS0 will be selected. In a feedback loop, if the prediction is correct, conditional instruction prediction module 304 can move the state machine 600 to state 606 ("RS0 Strong"). If the prediction is instead incorrect, conditional instruction prediction module 304 can move the state machine 600 back to ground state 602.

Once state machine 600 has reached state 606, it can be moved back to state 604 if the prediction from state 606 proves to be incorrect. Conditional instruction prediction module 304 can move the state machine 600 to other states 608, 610, and 612 depending on feedback of execution results. In the illustrated embodiment in FIG. 6, states 612 represent states, such as "RS1 Weak," "RS1 Strong," "RS2 Weak," "RS2 Strong," . . . "RSn−1 Weak," "RSn−1 Strong," (not shown) branching from state 602, similar to states 604 and 606 branching from ground state 602.

Figure 7:
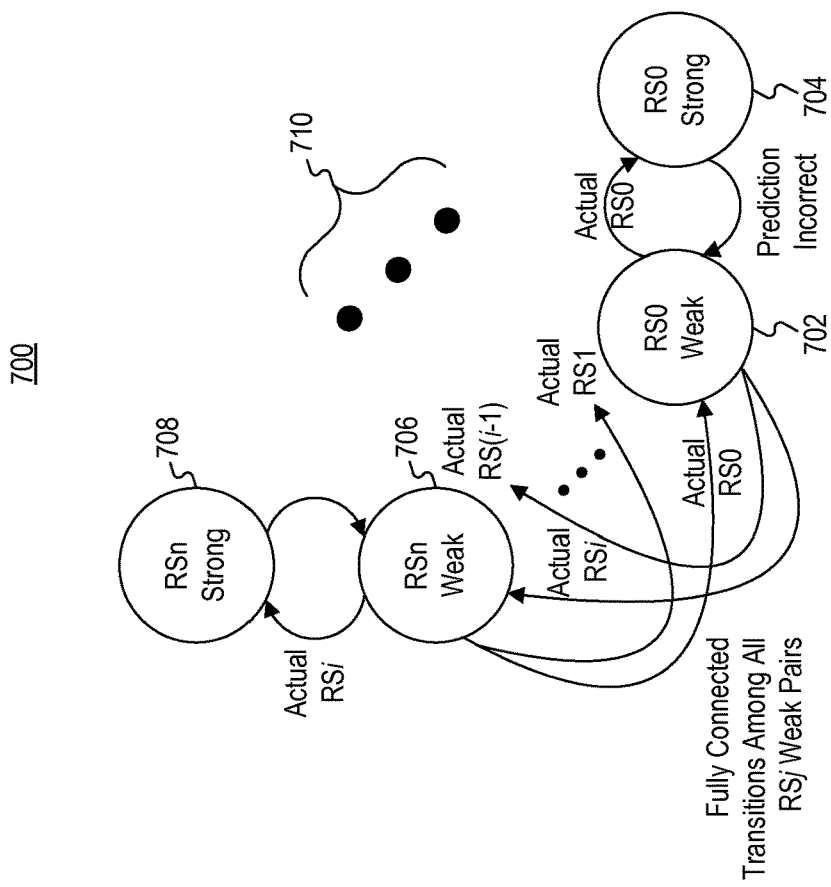
FIG. 7 is an exemplary state machine consistent with this disclosure.

FIG. 7 shows an exemplary state machine 700 for tracking execution results of conditional instructions, consistent with embodiments of this disclosure. In this example, similar to the example discussed above with respect to FIG. 6, conditional instruction prediction module 304 determines that the type of conditional instruction is conditional select, which selects a register from a plurality of registers RS0, RS1, RS2, . . . , RSn. Referring to FIG. 7, each weak state is coupled to all other weak states and no ground state exists.

When conditional instruction prediction module 304 receives a conditional instruction and its predicate, it may randomly make a prediction (e.g., a selection of one of the registers) based on one of the weak states (e.g., state 702, "RS0 Weak"). If the prediction is correct, conditional instruction prediction module 304 moves the state machine 700 to a strong state (e.g., state 704, "RS0 Strong"). If the prediction is incorrect, conditional instruction prediction module 304 moves the state machine 700 to another weak state based on the actual execution results that select a register. For example, if the prediction selects register RS0, but the execute results indicate the selection is actually of register RSn, conditional instruction prediction module 304 moves the state machine 700 from state 702 ("RS0 Weak") to state 706 ("RSn Weak").

The example shown in FIG. 7 can potentially reduce the time of the learning process. Other aspects of FIG. 7 are similar to those of FIG. 6. For example, when state machine 700 is in a strong state (e.g., states 704, 708) and the prediction based on the strong state turns out to be incorrect, state machines 700 can move to a weak state (e.g., states 702, 706). In the illustrated embodiment of FIG. 7, states 710 represent states of selecting registers RS1, RS2, . . . , RSn−1, similar to states 702 and 704 of selecting register RS0.

Figure 8:
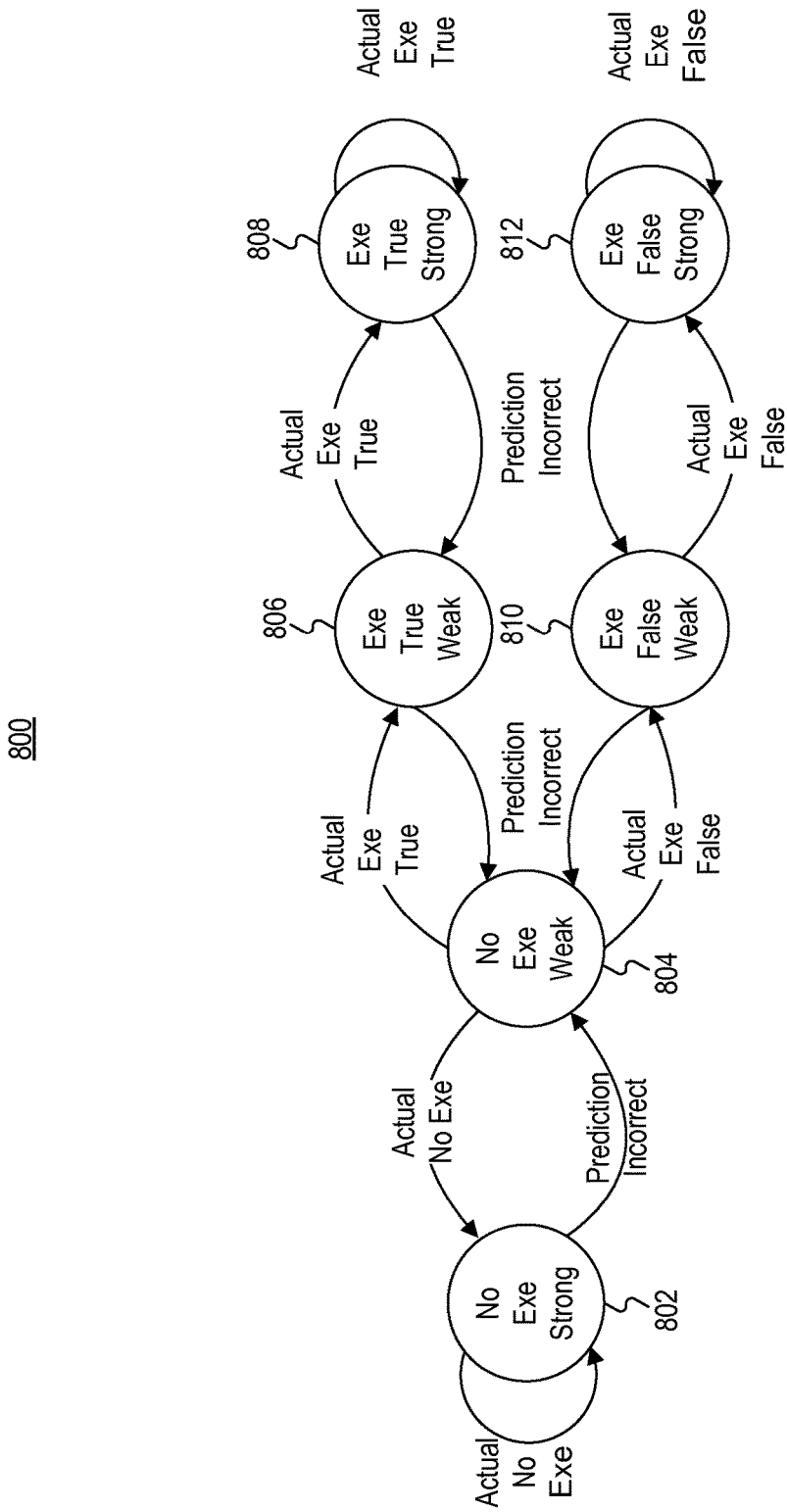
FIG. 8 is an exemplary state machine consistent with this disclosure.

FIG. 8 shows an exemplary state machine 800 for tracking execution results of conditional instructions, consistent with embodiments of this disclosure. When conditional instruction prediction module 304 receives conditional instruction information, it determines the type of the conditional instructions to select a state machine corresponding to the type. In the illustrated embodiment, the conditional instructions are to perform a comparison based on predicates. For example, in one embodiment, the instruction is to compare the value of a register with a pre-determined value when the predicate is satisfied. Referring to FIG. 8, state machine may initially be in state 802 ("No Exe Strong"), where no execution (e.g., no comparison) is performed.

When it receives a conditional instruction and its predicate, conditional instruction prediction module 304 predicts that this instruction will not be performed based on state 802. If the prediction is correct, state machine 800 stays in state 802. If the prediction is wrong ("Prediction Incorrect"), conditional instruction prediction module 304 moves state machine 800 to state 804, where the probability of not executing the comparison is lower than in state 802. While in state 804, if comparison is not performed, conditional instruction prediction module 304 moves state machine 800 back to state 802.

In state 804, when the comparison is performed and the result of the comparison is true, state machine 800 is moved to state 806 ("Exe True Weak"). In state 806, when the prediction that the comparison is performed and the comparison result is true is correct, state machine is moved to state 808 ("Exe True Strong"); but when the prediction is incorrect (either the comparison is not performed or the comparison result is false), state machine 800 is moved back to state 804. In state 808, when the prediction that the comparison is performed and the comparison result is true is correct, state machine stays in state 808; but when the prediction is incorrect (either the comparison is not performed or the comparison result is false), state machine 800 is moved back to state 806.

In state 804, when the comparison is performed and the result of the comparison is false, state machine 800 is moved to state 810 ("Exe False Weak"). In state 810, when the prediction that the comparison is performed and the comparison result is false is correct, state machine is moved to state 812 ("Exe False Strong"); but when the prediction is incorrect (either the comparison is not performed or the comparison result is true), state machine 800 is moved back to state 804. In state 812, when the prediction that the comparison is performed and the comparison result is false is proved to be correct, state machine stays in state 812; but when the prediction is proved to be incorrect (either the comparison is not performed or the comparison result is true), state machine 800 is moved back to state 806.

Figure 9:
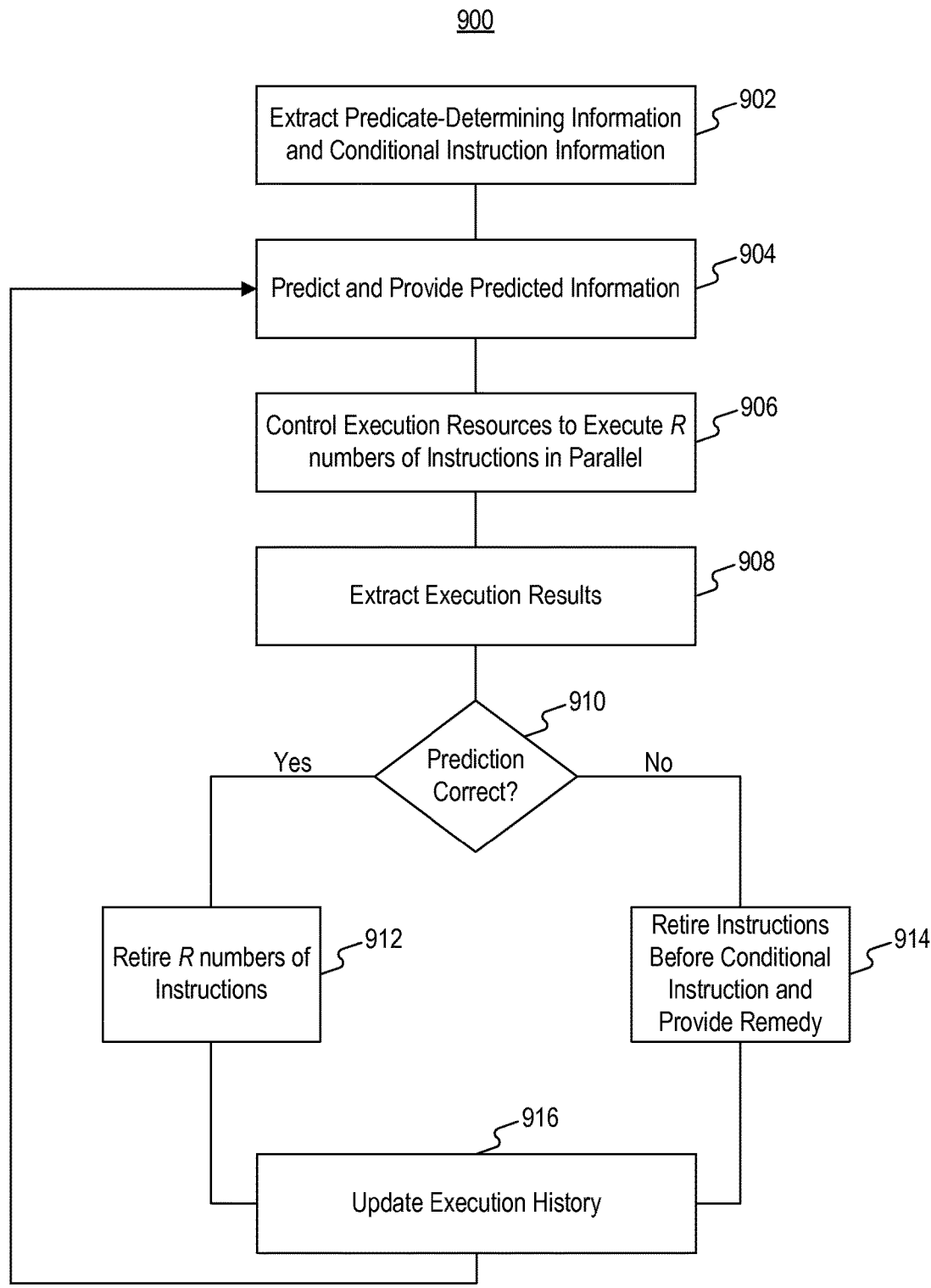
FIG. 9 shows a flow chart of an exemplary method of executing conditional instructions consistent with this disclosure.

Next, a method 900 of executing conditional instructions will be described. Referring to FIG. 9, in step 902, a device such as conditional instruction prediction module 204 (FIG. 2) extracts predicate-determining information of one or more predicate instructions and conditional instruction information of a conditional instruction. The conditional instruction will be execute depending on the execution results of the one or more predicate instructions. The predicate-determining information may include the location or address of the predicate instruction in the program, history of the predicate instructions, and any other information related to the one or more predicate instructions. The conditional instruction information may include the location or address of the conditional instruction in the program, the type and history of the conditional instruction, and any other information related to the conditional instruction.

Based on the predicate-determining information and conditional instruction information, in step 904 conditional instruction prediction module 204 predicts the execution results of the predicate instruction and the conditional instruction and provides the predicted information for executing the conditional and predicate instructions in parallel. The prediction may utilize a plurality of techniques to optimize precision and accuracy. Exemplary techniques may include multi-modal state, neural networks, machine learning, and any other suitable methods. In some embodiments, the prediction may be performed by one or more state machines.

In step 906, conditional instruction prediction module 204 controls a plurality of parallel execution resources to execute R numbers of instructions in parallel, including the predicate instructions, conditional instruction, and instructions subsequent to the conditional instruction. The conditional instruction is executed with the predicted execution results of the predicate instruction, and the instructions subsequent to the conditional instruction are executed with the predicted execution results of the conditional instruction.

In step 908, conditional instruction prediction module 204 extracts or acquires the execution results output from execution resources. In step 910, conditional instruction prediction module 204 determines whether the prediction is correct based on the execution results. In one embodiment, conditional instruction prediction module 204 compares the predicted execution results of the predicate instruction with the actual execution results and determines that the prediction is correct if the predicted and actual results are matched. If the prediction is correct (Yes), the method moves to step 912 where conditional instruction prediction module 204 retires all of the parallel-executed instructions. If the prediction is incorrect (No), in step 914 conditional instruction prediction module 204 retires instructions before the conditional instruction and provides a remedy. In some embodiments, when the prediction is incorrect, as a remedy conditional instruction prediction module 204 flushes and re-executes the conditional instructions and those younger than the conditional instruction, using the actual execution results.

In step 916, conditional instruction prediction module 204 updates the execution history of the predicate and conditional instructions. In some embodiments, conditional instruction prediction module 204 hashes the histories or the addresses of the instructions to create a hash table such that the histories may be accessed or referenced for further execution of conditional instructions. The updated execution history may be referenced in step 904 as a basis for prediction.

Method 900 can be implemented as instructions stored in a non-transitory storage medium, e.g., included in memory unit, such as ROM 104, RAM 106, or storage unit 114 (FIG. 1) and executed by one or more processors, such as CPU 102 (FIG. 1).

Apparatus and methods consistent with the embodiments of this disclosure can improve the speed of devices by efficiently executing instructions in parallel utilizing prediction and reduce execution errors by providing a remedy when the prediction turns out to be incorrect.

Although exemplary embodiments have been shown and described, it will be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. A device for executing conditional instructions, the device comprising:
   one or more processors; and
   a memory unit including a plurality of registers storing at least a predicate instruction and a conditional instruction, executable by the one or more processors, wherein the conditional instruction is based on one or more values to be produced by the predicate instruction,
   wherein the one or more processors are configured to:
      extract predicate-determining information of the predicate instruction and conditional instruction information of the conditional instruction;
      predict execution results for the predicate instruction based on the predicate-determining information, and predict execution results for the conditional instruction based on the predicted execution results for the predicate instruction and the conditional instruction information;
      execute the predicate instruction and the conditional instruction in parallel, wherein execution of the conditional instruction is based on the predicted execution results for the predicate instruction;
      acquire the execution results of the predicate instruction and the conditional instruction;
      determine whether the predicted execution results are correct;
      if it is determined that the predicted execution results are correct, retire the predicate instruction and the conditional instruction; and
      if it is determined that the predicted execution results are incorrect, retire the predicate instruction and provide a remedy to the conditional instruction.

2. The device according to claim 1, wherein the one or more processors are further configured to:
   execute at least one instruction younger than the conditional instruction, in parallel with the execution of the predicate instruction and the conditional instruction;
   if it is determined that the predicted execution results are correct, retire the younger instruction; and
   if it is determined that the predicted execution results are incorrect, provide a remedy to the younger instruction.

3. The device according to claim 2, wherein the one or more processors are further configured to:
   update execution history of the predicate instruction and the conditional instruction.

4. The device according to claim 2, wherein the remedy includes:
   flushing the conditional instruction and the younger instruction; and
   re-executing the conditional instruction and the younger instruction based on the execution results of the predicate instruction.

5. The device according to claim 1, wherein the one or more processors are configured to predict utilizing at least one of multi-modal state, neural networks, or machine learning.

6. The device according to claim 1, wherein the predicate-determining information includes at least one of a location of the predicate instruction in a program or a history of the predicate instruction.

7. The device according to claim 1, wherein the conditional instruction information includes at least one of a location of the conditional instruction in a program, a history of the conditional instruction, or a type of the conditional instruction.

8. A method of executing at least a predicate instruction and a conditional instruction stored in a plurality of registers by one or more processors, wherein the conditional instruction is based on one or more values to be produced by the predicate instruction, the method comprising:
   extracting predicate-determining information of the predicate instruction and conditional instruction information of the conditional instruction;
   predicting execution results for the predicate instruction based on the predicate-determining information, and predicting execution results for the conditional instruction based on the predicted execution results for the predicate instruction and the conditional instruction information;
   executing the predicate instruction and the conditional instruction in parallel, wherein execution of the conditional instruction is based on the predicted execution results for the predicate instruction;
   acquiring the execution results of the predicate instruction and the conditional instruction;
   determining whether the predicted execution results are correct;
   if it is determined that the predicted execution results are correct, retiring the predicate instruction and the conditional instruction; and
   if it is determined that the predicted execution results are incorrect, retiring the predicate instruction and provide a remedy to the conditional instruction.

9. The method according to claim 8, further comprising:
   executing at least one instruction younger than the conditional instruction, in parallel with the execution of the predicate instruction and the conditional instruction;
   if it is determined that the predicted execution results are correct, retiring the younger instruction; and
   if it is determined that the predicted execution results are incorrect, providing a remedy to the younger instruction.

10. The method according to claim 9, further comprising:
    updating execution history of the predicate instruction and the conditional instruction.

11. The method according to claim 9, wherein the remedy includes:
    flushing the conditional instruction and the younger instruction; and
    re-executing the conditional instruction and the younger instruction based on the execution results of the predicate instruction.

12. The method according to claim 8, wherein the predicting is performed by utilizing at least one of multi-modal state, neural networks, or machine learning.

13. The method according to claim 8, wherein the predicate-determining information includes at least one of a location of the predicate instruction in a program or a history of the predicate instruction.

14. The method according to claim 8, wherein the conditional instruction information includes at least one of a location of the conditional instruction in a program, a history of the conditional instruction, or a type of the conditional instruction.

15. A non-transitory computer-readable medium storing instructions which, when executed by one or more processors, cause the one or more processors to execute at least a predicate instruction and a conditional instruction, wherein the conditional instruction is based on one or more values to be produced by the predicate instruction, and wherein the one or more processors are configured to:
    extract predicate-determining information of the predicate instruction and conditional instruction information of the conditional instruction;
    predict execution results for the predicate instruction based on the predicate-determining information, and predict execution results for the conditional instruction based on the predicted execution results for the predicate instruction and the conditional instruction information;
    execute the predicate instruction and the conditional instruction in parallel, wherein execution of the conditional instruction is based on the predicted execution results for the predicate instruction;
    acquire the execution results of the predicate instruction and the conditional instruction;
    determine whether the predicted execution results are correct;
    if it is determined that the predicted execution results are correct, retire the predicate instruction and the conditional instruction; and
    if it is determined that the predicted execution results are incorrect, retire the predicate instruction and provide a remedy to the conditional instruction.

16. The medium according to claim 15, wherein the one or more processors are further configured to:
    execute at least one instruction younger than the conditional instruction, in parallel with the execution of the predicate instruction and the conditional instruction;
    if it is determined that the predicted execution results are correct, retire the younger instruction; and
    if it is determined that the predicted execution results are incorrect, provide a remedy to the younger instruction.

17. The medium according to claim 16, wherein the one or more processors are further configured to:
    update execution history of the predicate instruction and the conditional instruction.

18. The medium according to claim 16, wherein the remedy includes:
    flushing the conditional instruction and the younger instruction; and
    re-executing the conditional instruction and the younger instruction based on the execution results of the predicate instruction.

19. The medium according to claim 15, wherein the one or more processors are further configured to predict by utilizing at least one of multi-modal state, neural networks, or machine learning.

20. The medium according to claim 15, wherein the predicate-determining information includes at least one of a location of the predicate instruction in a program or a history of the predicate instruction.

21. The medium according to claim 15, wherein the conditional instruction information includes at least one of a location of the conditional instruction in a program, a history of the conditional instruction, or a type of the conditional instruction.

\* \* \* \* \*